US011500491B2

(12) United States Patent
Chretien et al.

(10) Patent No.: US 11,500,491 B2
(45) Date of Patent: Nov. 15, 2022

(54) TOUCH SCREEN SYSTEM COMPRISING TWO TOUCH PANELS DISPOSED SIDE BY SIDE

(71) Applicant: THALES, Courbevoie (FR)

(72) Inventors: Sébastien Chretien, Merignac (FR); Christophe Dubau, Merignac (FR); Frédéric Renaud, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/331,581

(22) Filed: May 26, 2021

(65) Prior Publication Data

US 2021/0382600 A1    Dec. 9, 2021

(30) Foreign Application Priority Data

Jun. 4, 2020  (FR) ...................................... 2005847

(51) Int. Cl.
 *G06F 3/041* (2006.01)
 *G06F 3/044* (2006.01)
(52) U.S. Cl.
 CPC .......... *G06F 3/04182* (2019.05); *G06F 3/044* (2013.01)
(58) Field of Classification Search
 CPC .... G06F 3/044; G06F 3/04182; G06F 3/0416; G06F 2203/04104
 USPC ...................................................... 345/173
 See application file for complete search history.

(56) References Cited

U.S. PATENT DOCUMENTS

| 8,592,698 B2 * | 11/2013 | Hung ................. G06F 3/04166 345/173 |
| 8,810,543 B1 | 8/2014 | Kurikawa |
| 2009/0250269 A1 | 10/2009 | Hung et al. |
| 2012/0056662 A1 | 3/2012 | Wilson et al. |
| 2015/0077647 A1 * | 3/2015 | Chiou ................. G06F 3/04166 349/12 |
| 2015/0185935 A1 | 7/2015 | Jang et al. |

FOREIGN PATENT DOCUMENTS

FR    3 072 803 A1    4/2019

OTHER PUBLICATIONS

Moussy, et al., "A Comparative View on Exemplar Tracking-by-Detection Approaches", Univ de Toulouse, Sep. 23, 2015.
Fisher, et al., "A comparison of algorithms for subpixel peak detection", Image Technology, 1996.

* cited by examiner

*Primary Examiner* — Jimmy H Nguyen
(74) *Attorney, Agent, or Firm* — BakerHostetler (57) ABSTRACT

A touch screen system includes two rectangular matrix touch panels, broken down into cells and disposed side by side forming a border between the two touch panels, each touch panel being connected to a respective touch screen board, and a data communication link between the boards, the two boards and respectively the two touch panels being configured as a master/slave configuration and to exchange respective data.

7 Claims, 13 Drawing Sheets

Estimated contacts

Estimated contacts

TOUCH SCREEN SYSTEM COMPRISING TWO TOUCH PANELS DISPOSED SIDE BY SIDE

CROSS-REFERENCE TO RELATED APPLICATIONS

This application claims priority to foreign French patent application No. FR 2005847, filed on Jun. 4, 2020, the disclosure of which is incorporated by reference in its entirety.

FIELD OF THE INVENTION

The invention relates to a touch screen system comprising two touch panels disposed side by side.

The field of the invention relates to the functioning of a large screen touch screen, or "large screen", in an aircraft cockpit. Present touch technology does not make it possible to produce touch panels larger than 15 inches diagonal. In order to overcome this problem, two touch panels are placed side by side. Each panel is managed by an electronic board.

BACKGROUND

Such an architecture entails the following constraints. The touch interface must be unique: the computer using the touch data sees only one single sensor; the passage of a finger from one panel to the other must be transparent to the user. Moreover, the cycle times depend on the processings carried out, notably on the number of fingers on the touch interface, the cycle times of the two boards therefore being different.

Future airliners require wide screens in order to display the various items of information necessary for the correct progress of the flight. In order to reduce the number of controls and buttons, these screens are touch screens.

Figure 1:
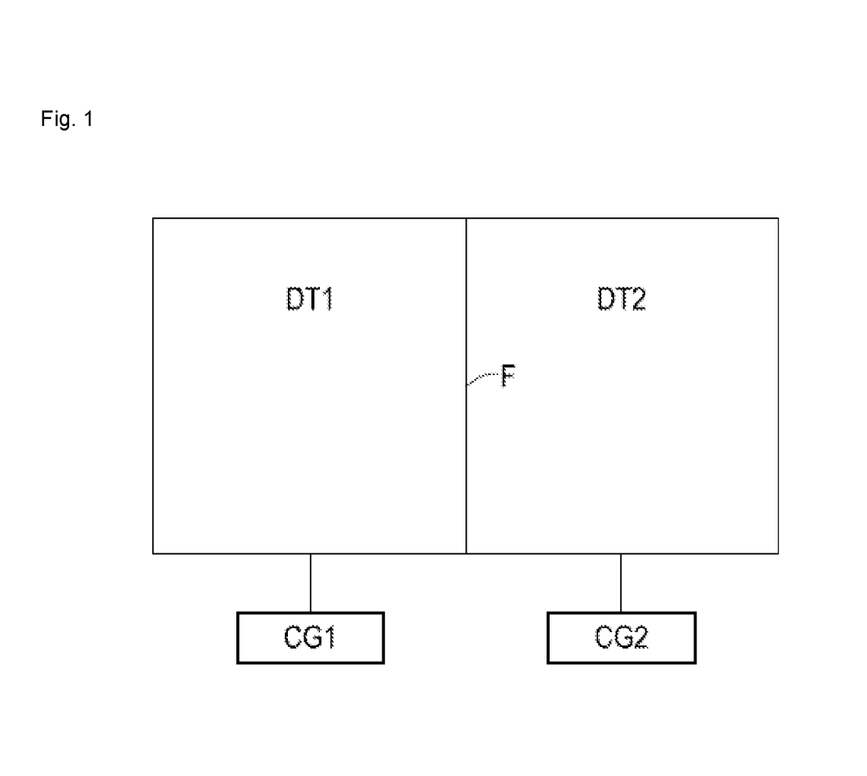
FIG. 1 is a diagrammatic illustration of a touch screen system comprising two juxtaposed rectangular matrix touch panels, according to the prior art.

The objective is to address screens having a size of at least 15". The touch panel technology used is usually ITO, standing for "Indium Tin Oxide". However, this technology is limited by the size of the electrodes and therefore their resistivities: 355 mm maximum for a diamond mesh. Conventionally, this corresponds to screen sizes of 15". Moreover, in order to address screens larger than 15", two touch panels or touch pads DT1, DT2, called "Active Area" are placed side by side and have a border F corresponding to the junction of their sides placed edge to edge. In order to control these two touch panels DT1, DT2, two electronic management boards CG1, CG2, or "Touch Screen Boards", are used, as shown in FIG. 1.

The following constraints must be complied with:
the interface is the same as for a single touch panel, i.e. the computer using the touch data must see only one single sensor;
the passage from one touch panel to the other must be transparent to the user;
manage the asynchronism of the two touch panels, because the cycle time varies as a function of the number of fingers in contact with a panel and of the operating mode (debugging, operational).

Figure 2:
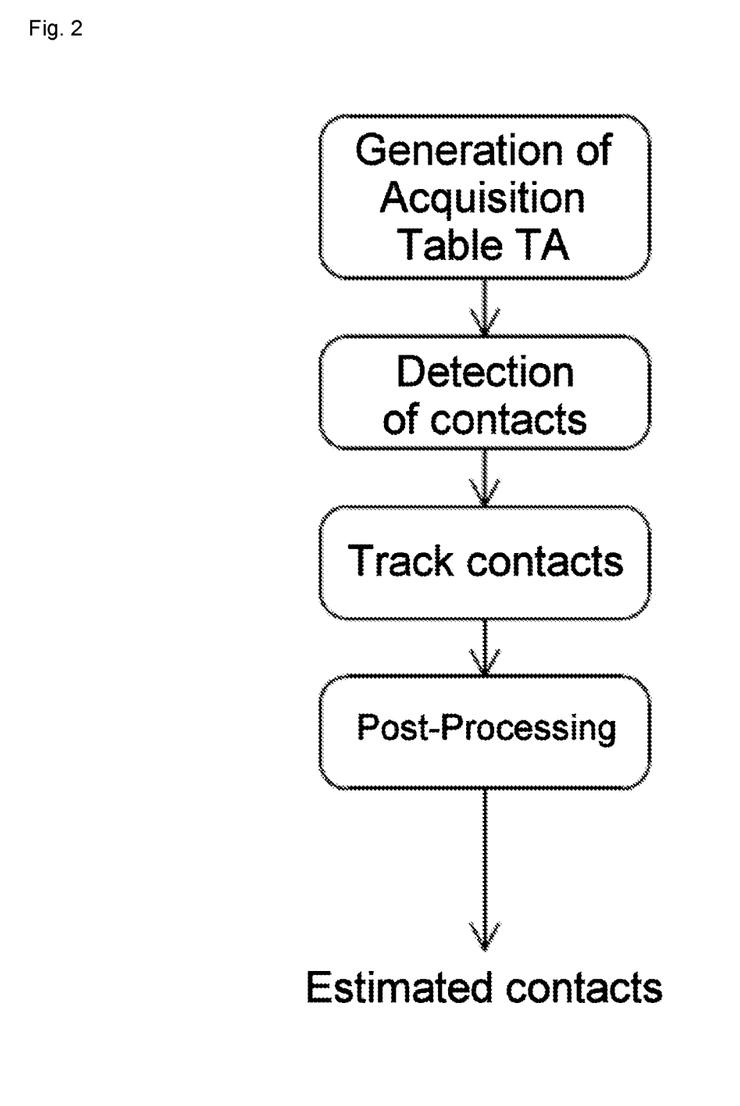
FIG. 2 is a diagrammatic illustration of the processing carried out by each touch screen board of a touch screen of a system, as shown in FIG. 1, according to the prior art.

A conventional system for detecting touches on a touch panel is shown in FIG. 2.

This system begins with the generation of an acquisition table TA of the capacitance variations of the cells of the touch panel. Then there is a detection of contacts and a tracking of the contacts, by conventional algorithms. The detection of contacts uses for example the algorithm described in the document "A comparison of algorithms for subpixel peak detection" by R. Fisher and D. K. Naidu, Image Technology, pp. 385-404, 1996. The tracking of contacts uses for example the algorithm described in the document "A Comparative View on Exemplar Tracking-by-Detection Approaches" by Elie Moussy, Alhayat Ali Mekonnen, Guilhem Marion, and Frederic Lerasle. Finally, a post-processing is carried out on the contact tracking data, comprising for example the application of a smoothing filter. The estimated positions of the contacts are delivered at the output of the system.

It is therefore necessary to adapt this detection system for the use of two juxtaposed touch panels. Such adaptations of the system are known, as mentioned in the documents FR3072803 A1 and US 2015/0185935.

Figure 3:
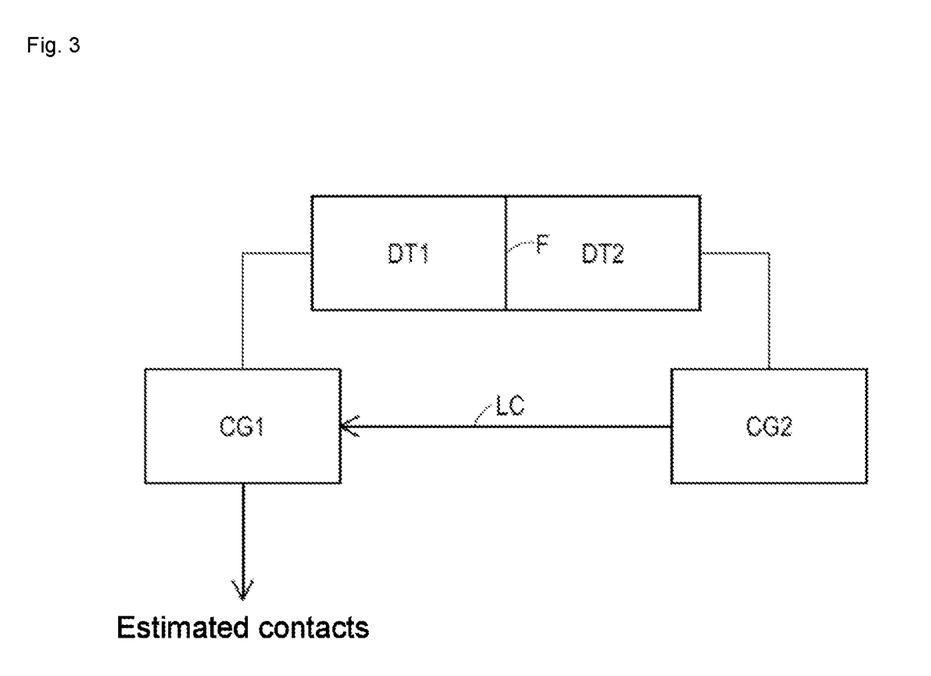
FIG. 3 is a diagrammatic illustration of a touch screen system comprising two juxtaposed rectangular matrix touch panels, configured as a master/slave configuration, according to the prior art.

FIG. 3 is a diagrammatic representation of two juxtaposed rectangular matrix touch panels DT1, DT2, comprising a border F between the two touch panels DT1, DT2, each touch panel being connected to a respective touch screen board CG1, CG2. The two touch panels DT1, DT2 and the two touch screen boards CG1, CG2 respectively are configured as a master/save configuration, the index 1 relating to the master components and the index 2 relating to the slave components.

Figure 4:
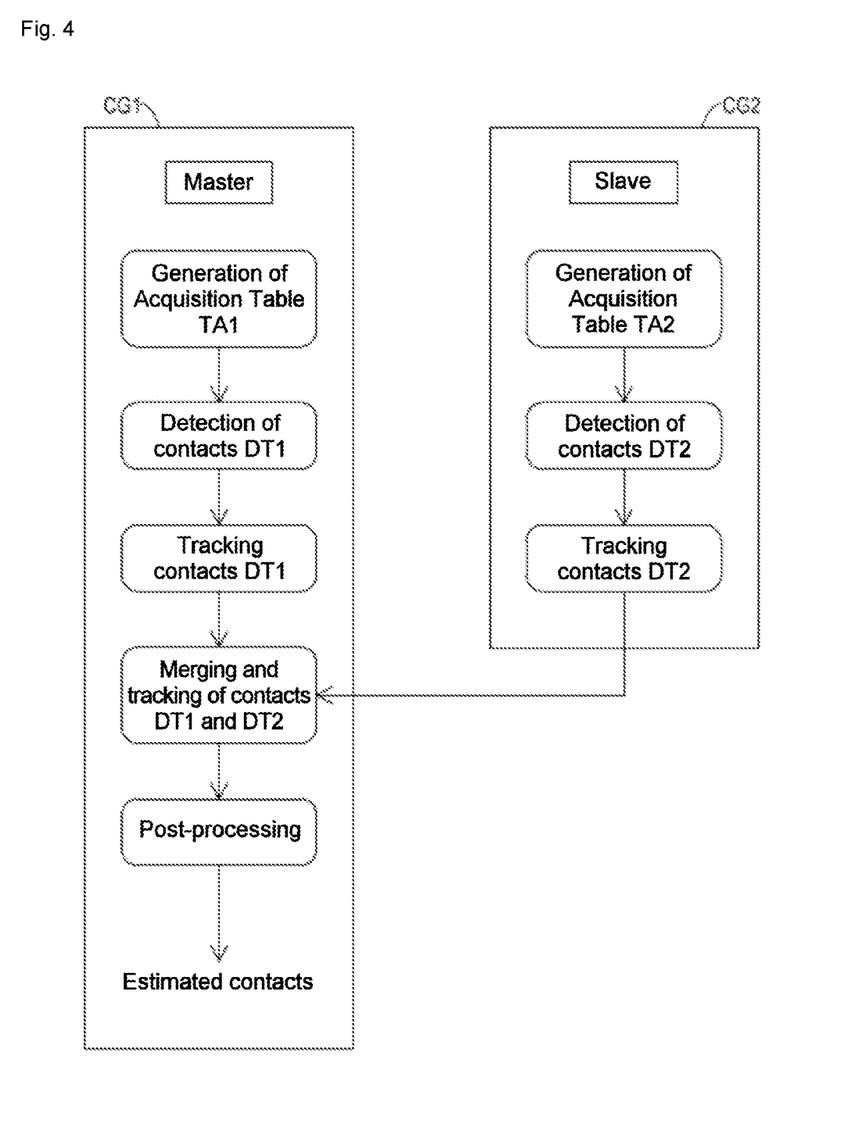
FIG. 4 is a diagrammatic illustration of the processing carried out by two touch screen boards of a system, as shown in FIG. 3, according to the prior art.

A data communication link LC allows the transmission of data from the slave board CG2 to the master board CG1. In this architecture shown in FIG. 3, the touch screen boards CG1, CG2 carry out all of the processing, as shown in FIG. 4.

Each slave board CG1, CG2 carries out respectively, for its associated touch panel DT1, DT2, a generation of an acquisition table TA1, TA2 of the capacitance variations of the cells of its associated touch panel. Then, each slave board CG1, CG2 carries out, for its associated touch panel DT1, DT2 respectively, a detection of contacts and a tracking of the contacts.

The slave board CG2 sends its results to the master board CG1, which alone executes a merging and again a tracking of the data generated by the two boards CG1, CG2, in order to allocate a unique identifier to each detected contact.

Finally, the master board CG1 alone carries out a post-processing of the merged and tracked data, comprising for example the application of a smoothing filter. The estimated positions of the contacts are then delivered at the output of the master board CG1.

At the junction or border F of the two touch panels DT1, DT2, the master board CG1 manages a border or bordering area, corresponding to a distance from the border, as a number of cells, below a threshold. Its size is a few centimetres wide on each side of the border F. In this area, the master board CG1 merges the contact detections seen on both sides, i.e. on the two touch panels, the master touch panel DT1 and the slave touch panel DT2.

This embodiment uses a merge and tracking processing in order to merge and track the detections made by the two boards, the master board CG1 and the slave board CG2.

Figure 5:
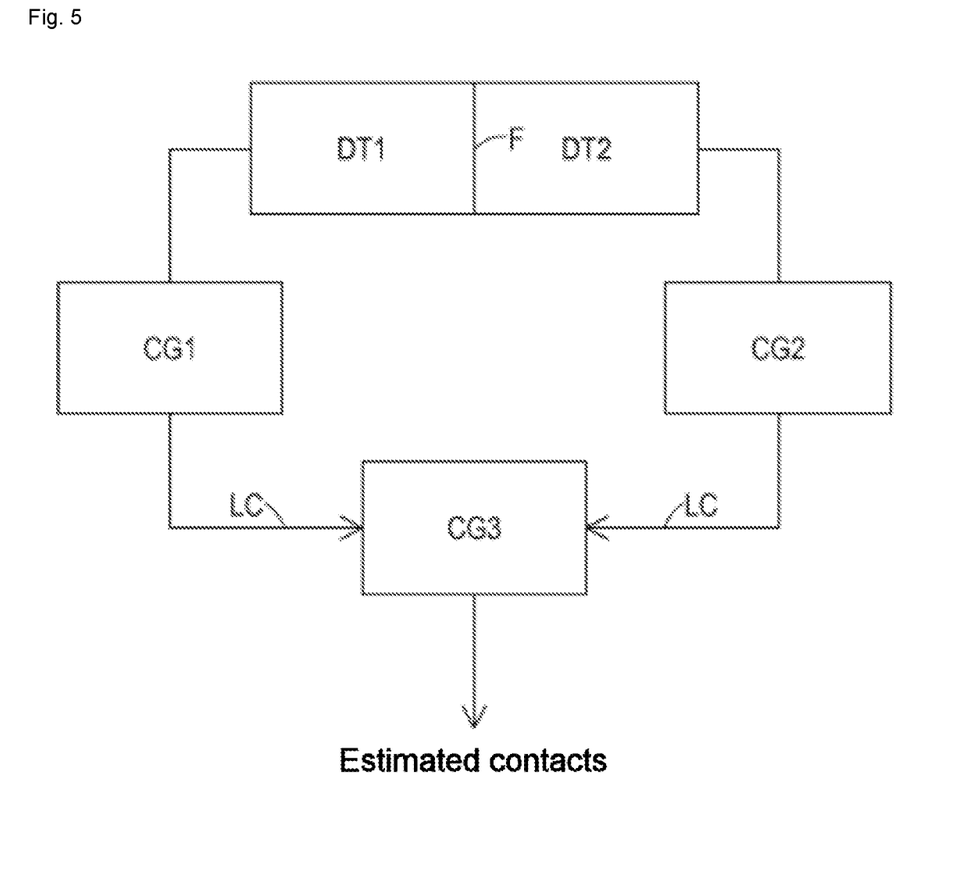
FIG. 5 is a diagrammatic illustration of a touch screen system comprising two juxtaposed rectangular matrix touch panels, configured as a master/slave configuration, according to the prior art.

It is also known to use an embodiment having three touch screen boards CG1, CG2 and CG3, such as shown in FIG. 5.

Two rectangular matrix touch panels DT1, DT2, are juxtaposed and comprise a border F between the two touch panels DT1, DT2. Each touch panel DT1, DT2 is connected to a respective touch screen board CG1, CG2. The two touch screen boards CG1, CG2 are each connected to a third touch screen board CG3. The three touch screen boards CG1, CG2, CG3 are configured as a master/slave configuration, the third board CG3 being the master and the other two boards CG1, CG2 being slaves.

Two data communication links LC allow the transmission of data from the first and second slave boards CG1, CG2 to the third master board CG3.

Figure 6:
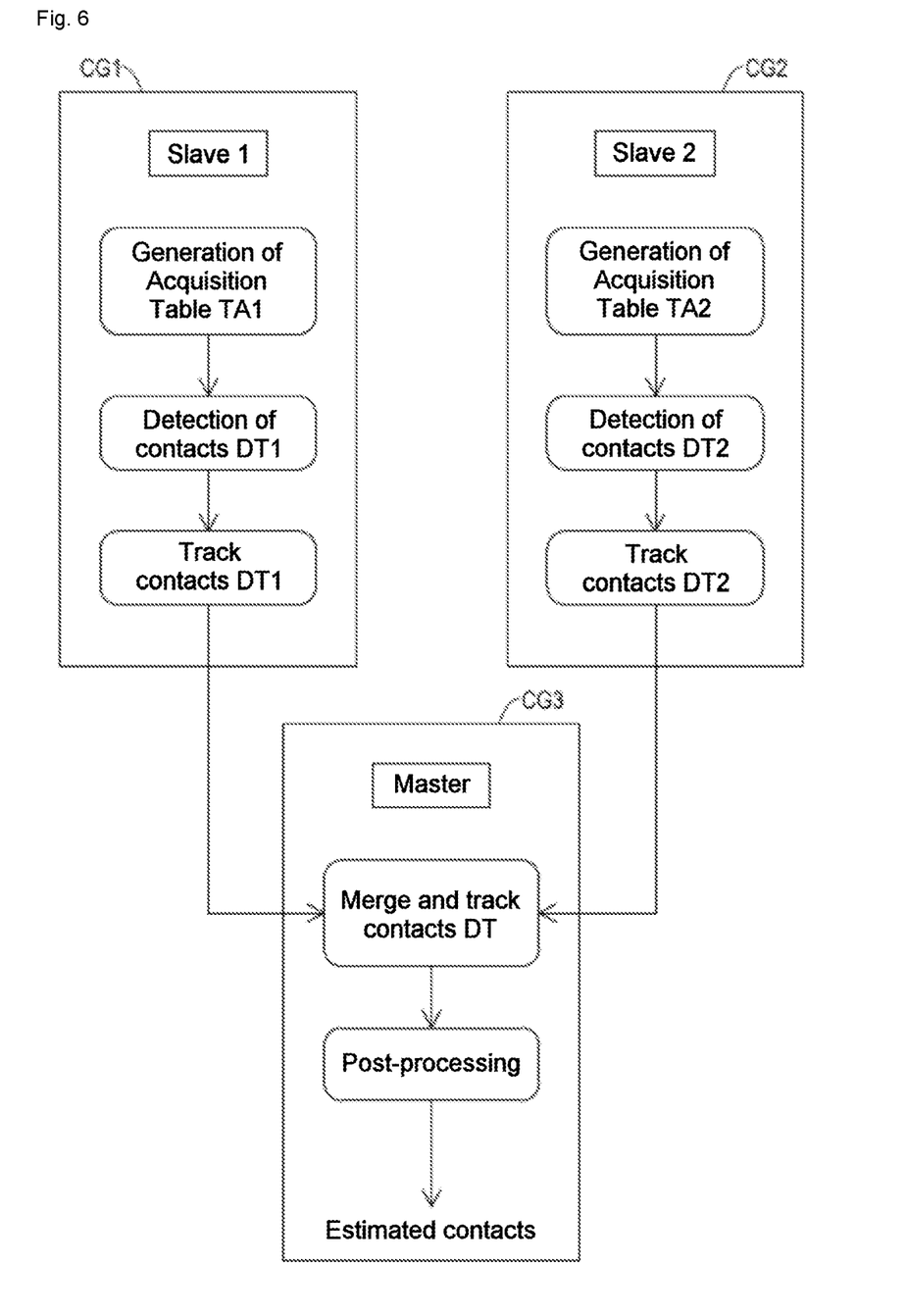
FIG. 6 is a diagrammatic illustration of the processing carried out by three touch screen boards of a system, as shown in FIG. 5, according to the prior art.

In this architecture shown in FIG. 5, the three touch screen boards CG1, CG2, CG3 carry out all of the processing as shown in FIG. 6.

Each master board CG1 and slave board CG2 carries out respectively, for its associated touch panel DT1, DT2, a generation of an acquisition table TA1, TA2 of the capacitance variations of the cells of its associated touch panel. Then, each master board CG1 and slave board CG2 carries out respectively, for its associated touch panel DT1, DT2, a detection of contacts and a tracking of the contacts.

Each slave board CG1, CG2 sends its results to the master board CG3, which alone executes a merging and again a tracking of the data generated by the two slave boards CG1, CG2, in order to allocate a unique identifier to each detected contact.

Finally, the master board CG3 alone carries out a post-processing of the merged and tracked data, comprising for example the application of a smoothing filter. The positions of the estimated contacts are then delivered at the output of the master board CG3.

At the junction or border F of the two touch panels DT1, DT2, the master board CG3 manages a border or bordering area, corresponding to a distance from the border, as a number of cells, below a threshold. Its size is a few centimetres wide on each side of the border F. In this area, the master board CG3 merges the detections of touches seen on both sides, i.e. on the two touch panels DT1, DT2.

These known embodiments using a border area have disadvantages.

In fact, in the border area, the estimation of the positions of the contacts is not very accurate, because the contact position is extrapolated by taking account of its adjacent cells. However, in the border area, close to the border F, cells adjacent to that of a contact can be located on the touch panel other than the one of the contact. The detection of the contact positions can be falsified by this, as shown in FIG. 7.

Figure 7:
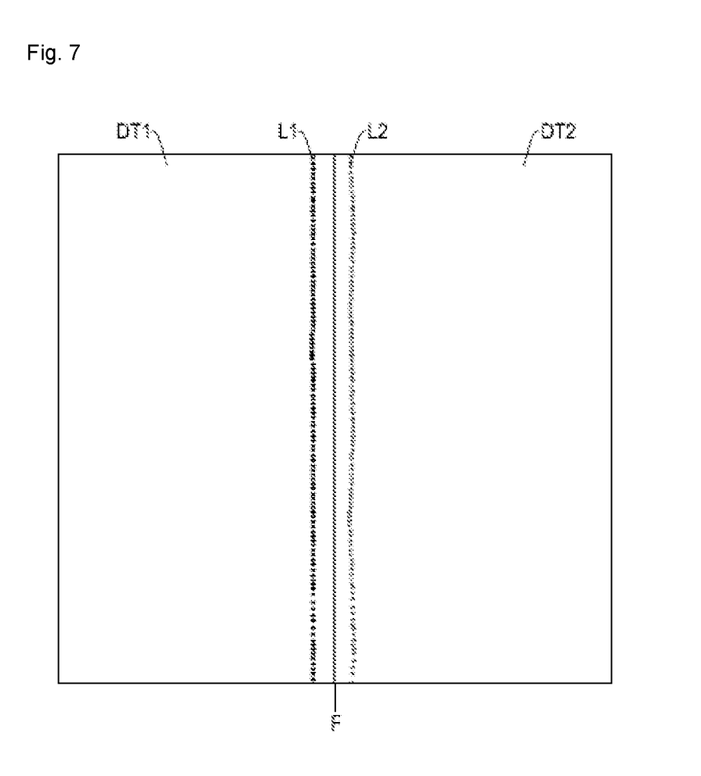
FIG. 7 is a diagrammatic illustration of the result of the estimation of the contacts by the embodiments shown in the preceding figures, according to the prior art.

FIG. 7 represents a finger moving over the junction or border F of the two touch panels DT1, DT2. L1 and L2 represent the estimated positions of the contacts, carried out by the processings of each board CG1, CG2.

A positioning error is visible. The existing methods mentioned consist of merging these flawed detections to produce only one from them. The resulting detection is therefore also flawed.

Moreover, the existing embodiments use a merging in the border area and, as shown in FIG. 7, the estimated detections are substantially distanced. This signature is identical to that of two close fingers. The merge processing cannot differentiate the case of a same finger visible on both panels from the case of two close fingers. Consequently, two close fingers can be merged whilst they should not have been.

Moreover, these existing solutions use supplementary processings. FIGS. 4 and 6 show the use of three tracking processings involving memory consumption and additional calculation times.

SUMMARY OF THE INVENTION

A purpose of the invention is to overcome the abovementioned problems.

Thus, here is proposed, according to one aspect of the invention, a touch screen system comprising two juxtaposed rectangular matrix touch panels, broken down into cells, comprising a border between the two touch panels, each touch panel being connected to a respective touch screen board, and a data communication link between said boards, the two boards and respectively the two touch panels being configured as a master/slave configuration, in which:

the master and slave boards are configured to generate and exchange a respective acquisition table of the capacitance variations of each cell of their respective master and slave panel;

the master and slave boards are respectively configured to estimate a respective position of the detection of a contact on the basis of the data from the central cell of the contact detected on a panel and from at least four cells surrounding the central cell, at least one of which belongs to the other panel when the central cell is located on the edge of the border;

the slave board (CG2) is configured to transmit the estimated position (Det2) of the detection of a contact to the master board (CG1);

the master board is configured to merge and track the positions of the detected contacts; and the master board is configured to apply filtering post-processings to the merged positions of the detected and tracked contacts.

Such a system makes it possible to substantially improve the accuracy of the estimated contacts, at low cost in terms of memory used and computing time.

In one embodiment, the master and slave boards are configured to exchange their respective operating statuses.

Thus, the master board can generate an overall status of the two touch panels.

In one embodiment, the master and slave boards are configured to carry out, whilst they are generating their respective acquisition table, a pre-detection of a contact in an area of the touch panels comprising the border and at a distance from the border, as a number of cells, less than a threshold, and configured to deactivate, in the case of absence of contact in that area, the exchanges between master and slave boards of the respective acquisition tables. Only the exchange of the acquisition tables TA1, TA2 is deactivated because if there are no contacts then there are no transmitted positions (i.e. no exchange of detected contacts).

Thus, in the case of no detection of contacts in the border area, the data transfer time is limited, notably because the data exchanges are limited.

According to one embodiment, a contact is a finger touch or a presence of a drop of water.

In one embodiment, the status of a board comprises:

a parameter representative of the master function or not of the board; and/or a parameter representative of the reception of an unknown user command; and/or a parameter representative of noise above a threshold; and/or a parameter representative of a detection of a number of contacts above a threshold; and/or a parameter representative of a test in progress; and/or a parameter representative of the touch function on standby of the respective touch panel; and/or a parameter representative of the absence of functional failure of the respective touch panel; and/or an error code representative of a detected error; and/or a possible command sent by a user.

Such a status makes it possible to return any anomaly determined on the two boards to the user.

In one embodiment, the master and slave boards are configured to be synchronised by changes of state or by software or hardware events.

The synchronisation ensures the simultaneous generation of the acquisition tables of the capacitance variations on each of the two boards. In the border area, this feature facilitates the merging and tracking processing. In fact, this processing no longer needs to take account of the movement of the contact between the two acquisitions in order to carry out the merging, which makes it possible to improve the merging by limiting the risks of merging a contact from another finger.

For example, the master and slave boards are configured to be synchronised by handshaking using signalling.

Synchronisation by signalling, or "handshaking", avoids dead times because no time margin is necessary. It does not necessitate a fixed cycle time. Finally, it is robust, because both boards must wait for each other before continuing.

BRIEF DESCRIPTION OF THE DRAWINGS

The invention will be better understood by studying several embodiments described as examples that are in no way limiting and given with reference to the appended drawings in which.

In all of the figures, the components having identical references are similar.

DETAILED DESCRIPTION

Figure 8:
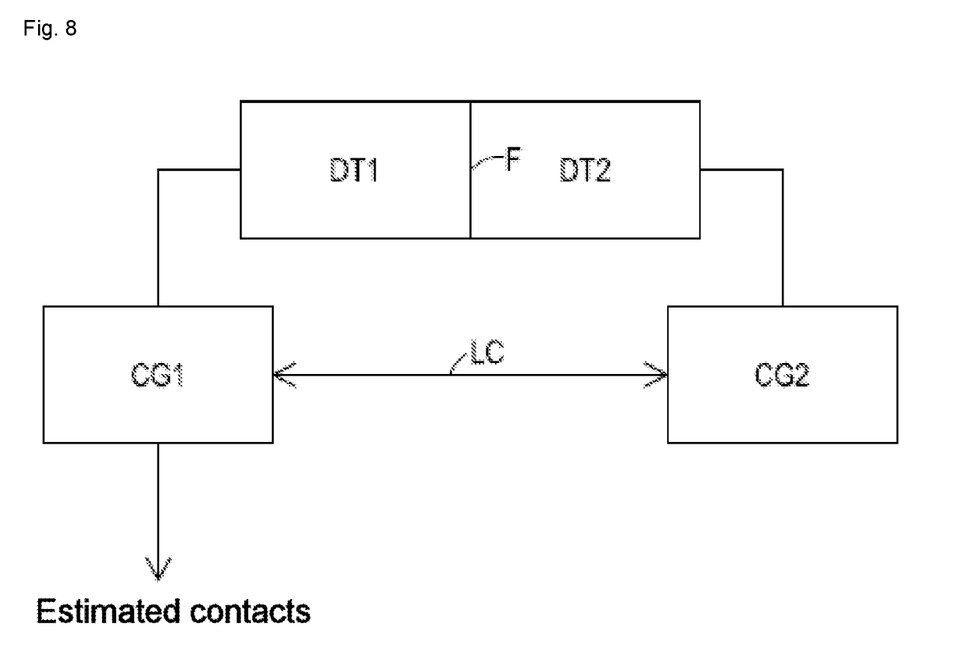
FIG. 8 is a diagrammatic illustration of a touch screen system comprising two juxtaposed rectangular matrix touch panels, configured as a master/slave configuration, according to one aspect of the invention.

FIG. 8 shows, according to one aspect of the invention, a touch screen system comprising two juxtaposed rectangular matrix touch panels DT1, DT2, broken down into cells, and comprising a border F between the two touch panels.

Each touch panel DT1 DT2 is connected to a respective touch screen board CG1, CG2, and a data communication link LC between the boards CG1, CG2 allows them to exchange data.

The two boards CG1, CG2 and respectively the two touch panels DT1, DT2 are configured as a master/slave configuration.

Figure 9:
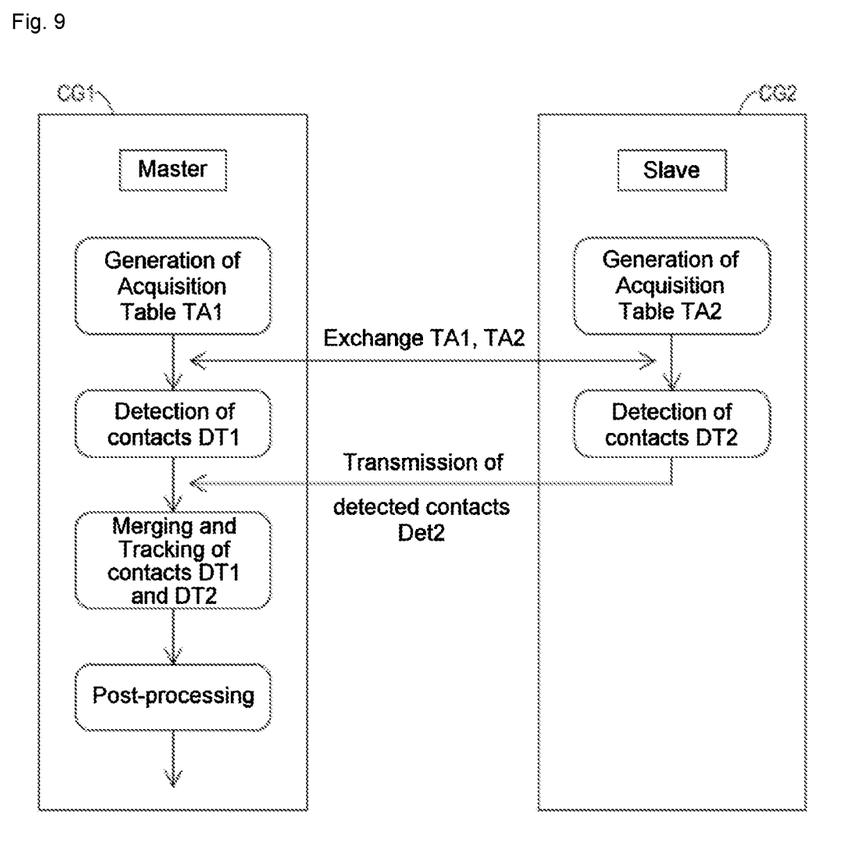
FIG. 9 is a diagrammatic illustration of the processing carried out by touch screen boards of the touch screens of a system as shown in FIG. 8, according to one aspect of the invention.

FIG. 9 shows the operation of the system according to one aspect of the invention.

The master CG1 and slave CG2 boards are configured for generating and exchanging a respective acquisition table TA1, TA2 of the capacitance variations of each cell of their respective touch panel DT1, DT2.

Figure 10:
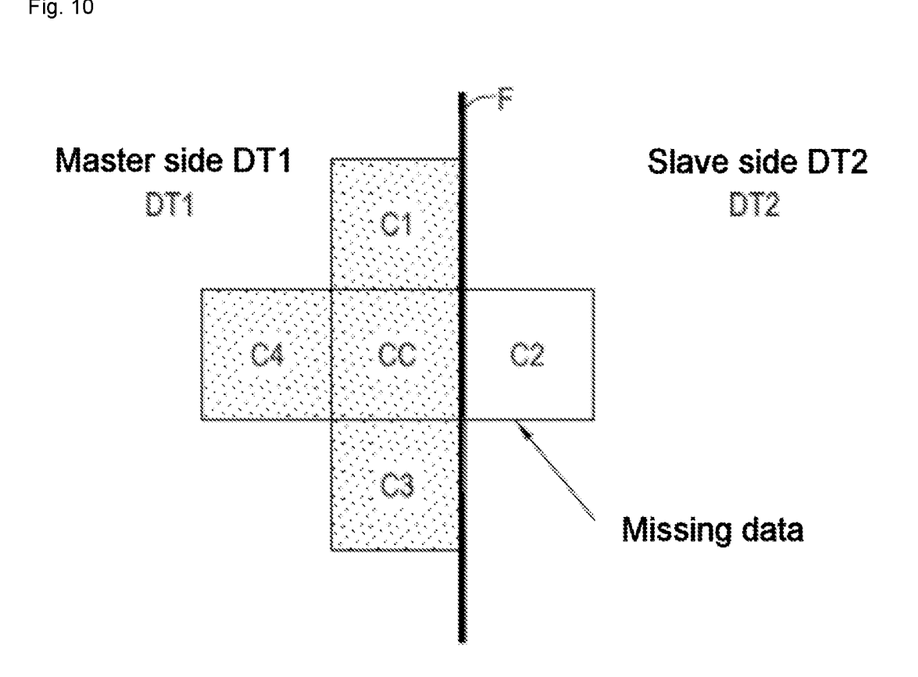
FIG. 10 is a diagrammatic illustration of a detail of cells in the border area, according to one aspect of the invention.

The master CG1 and slave CG2 boards are respectively configured to estimate a respective position Det1, Det2 of the detection of a contact on the basis of data of the central cell CC of the contact detected on a panel and of at least four cells C1, C2, C3, C4 surrounding the central cell CC, at least one of which belongs to the other panel (DT2, DT1) when the central cell (CC) is disposed on the edge of the border (F), as shown in FIG. 10.

The slave board (CG2) is configured to transmit the estimated position (Det2) of the detection of a contact to the master board (CG1).

A contact can be a finger touch or a presence of a drop of water.

The master board CG1 is configured to merge and track the positions of the detected contacts, and to apply filtering post-processings to the merged positions of the detected and tracked contacts.

Figure 9A:
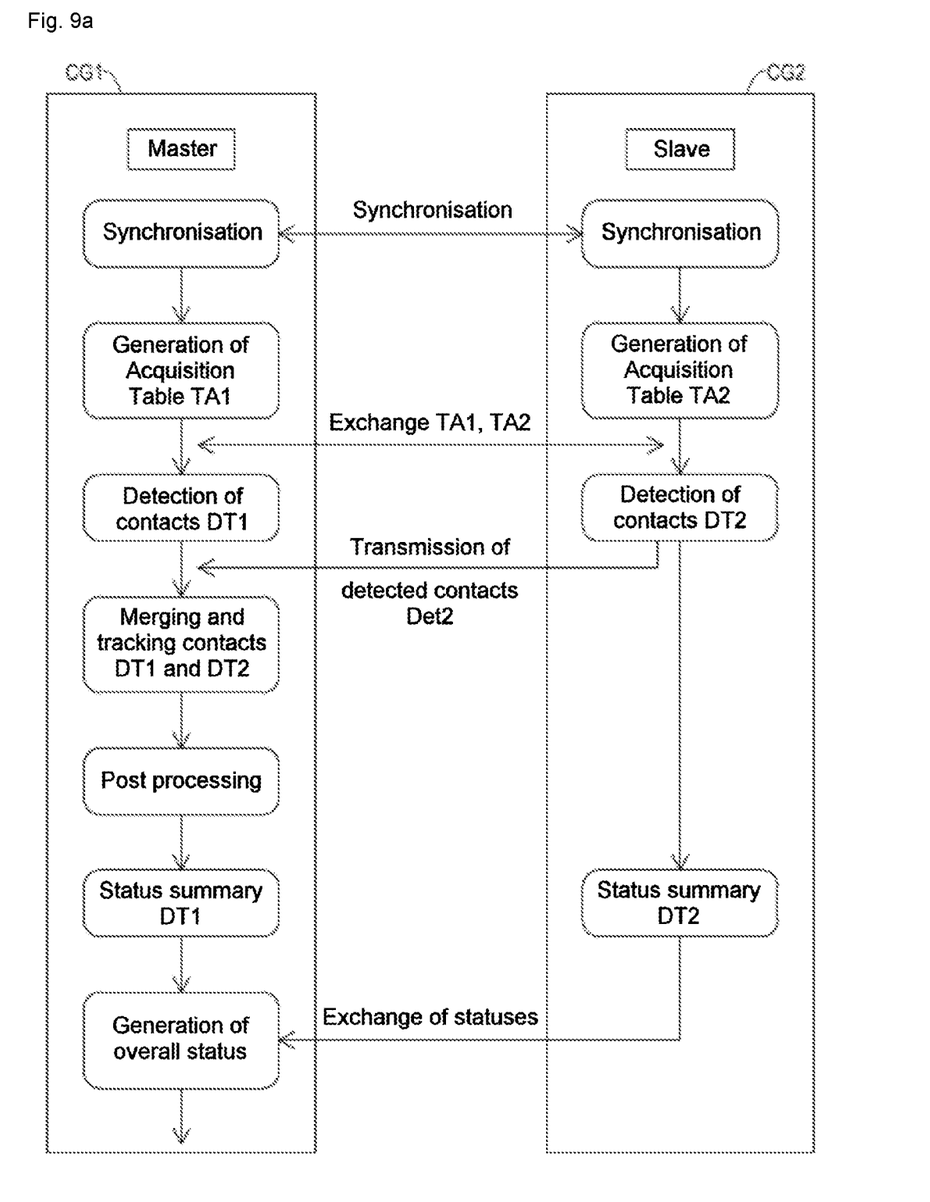
FIG. 9a is a diagrammatic illustration of the processing carried out by two touch screen boards of the touch screens of a system as shown in FIG. 8, according to one aspect of the invention.

As shown in FIG. 9a, the system according to one aspect of the invention can optionally comprise one or two of the following two optional technical features.

The master and slave boards CG1, CG2 are configured to exchange their respective operational statuses SF1, SF2, and/or to be synchronised by handshaking using signals.

The operational status of a touch screen board CG1, CG2 of a touch panel DT1, DT2, corresponds to values of operational parameters of the touch panel, generated by the touch screen board associated with the touch panel.

The status of a touch screen board can comprise:

a Master parameter representative of the master function or not of the board; and/or a Request_Error parameter representative of the reception of an unknown command; and/or a Touch_too_high parameter representative of a detection of a number of contacts above a threshold; and/or a Test_in_progress parameter representative of a test in progress; and/or an Idle parameter representative of the touch function on standby of the respective touch panel; and/or a Smooth_Running parameter representative of the absence of operational defects of the respective touch panel; and/or a Code_Error error code representative of a detected error; and/or a possible Order command sent by a user.

The respective exchange between the master CG1 and slave CG2 boards to be carried out is that of the respective acquisition tables TA1, TA2 of the capacitive variations ("Diff Data") of the touch panels DT1, DT2. This exchange is necessary for accurately calculating the position of the contact detections. The capacitive detection consists of producing a detection matrix or acquisition table composed of conductive lines and columns arranged in such a way as to detect the local variations of capacity introduced by the proximity of the user's fingers or of any other conductive selecting object. A capacitance variation is measured in each cell. The position is then estimated taking account of the central cell CC and of at least four surrounding cells C1, C2, C3, C4, as shown in FIG. 10. However, at the junction F of the two touch panels, cells necessary for the calculation of the position of a central cell CC of a touch panel can be situated on the other touch panel.

Thus, each board CG1, CG2 can estimate the detection of a contact in the border area with improved accuracy, because it also has knowledge of the acquisition table of the other board, and therefore of the capacitance variation data of the cells surrounding the central cell and belonging to the touch panel connected to the other touch screen board.

The exchange, or rather the transfer from the slave board CG2 to the master board CG1 of the contacts Det2 detected by the slave board CG2 allows the master board CG1 to carry out only one tracking, after having merged the detections of contacts estimated by the two boards, thanks to the exchange of the acquisition tables TA1, TA2.

The respective exchange between the master CG1 and slave CG2 boards, of the operational statuses of the boards CG1, CG2 makes it possible to provide the user with an overall status of the two boards.

The respective exchange of synchronisation data between the master CG1 and slave CG2 boards makes it possible to synchronise the master CG1 and slave CG2 boards, by handshaking using signals, which makes it possible to generate the acquisition tables simultaneously. This has the advantage of simplifying the work of merging in the border area. In fact, the movement of the contact between two acquisitions, in the border area, is not to be taken into account.

Figure 11:
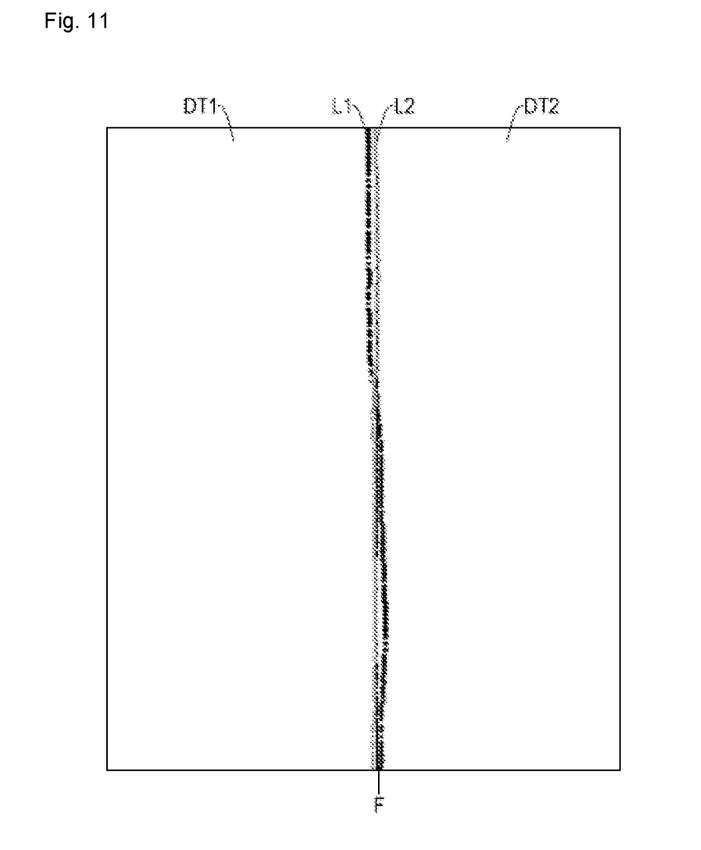
FIG. 11 is a diagrammatic illustration of the result of the estimation of the contacts by the embodiments shown in the preceding figures, according to one aspect of the invention.

FIG. 11, shows the improvement in the accuracy of the detections of contacts of each board in the border area, after the exchange of the acquisition tables TA1, TA2, between the master CG1 and slave CG2 boards, of the respective acquisition tables TA1, TA2 of the capacitance variations of the respective touch panels DT1, DT2. The accuracy is clearly improved in comparison with that shown in FIG. 7, without this exchange.

The master CG1 and slave CG2 boards can be configured to carry out, during their generation of the respective acquisition table TA1, TA2, a pre-detection of a contact in a border area, i.e. an area of the touch panels comprising the border F and at a distance from the border, as a number of cells, below a threshold, and configured for, in the case of absence of contact in this area, deactivating the exchanges between master CG1 and slave CG2 boards of the respective acquisition tables TA1, TA2. Thus, in the case of absence of detection of contact in the border area, these data processings and exchanges are avoided which therefore limits the computing time and the necessary memory.

Figure 12:
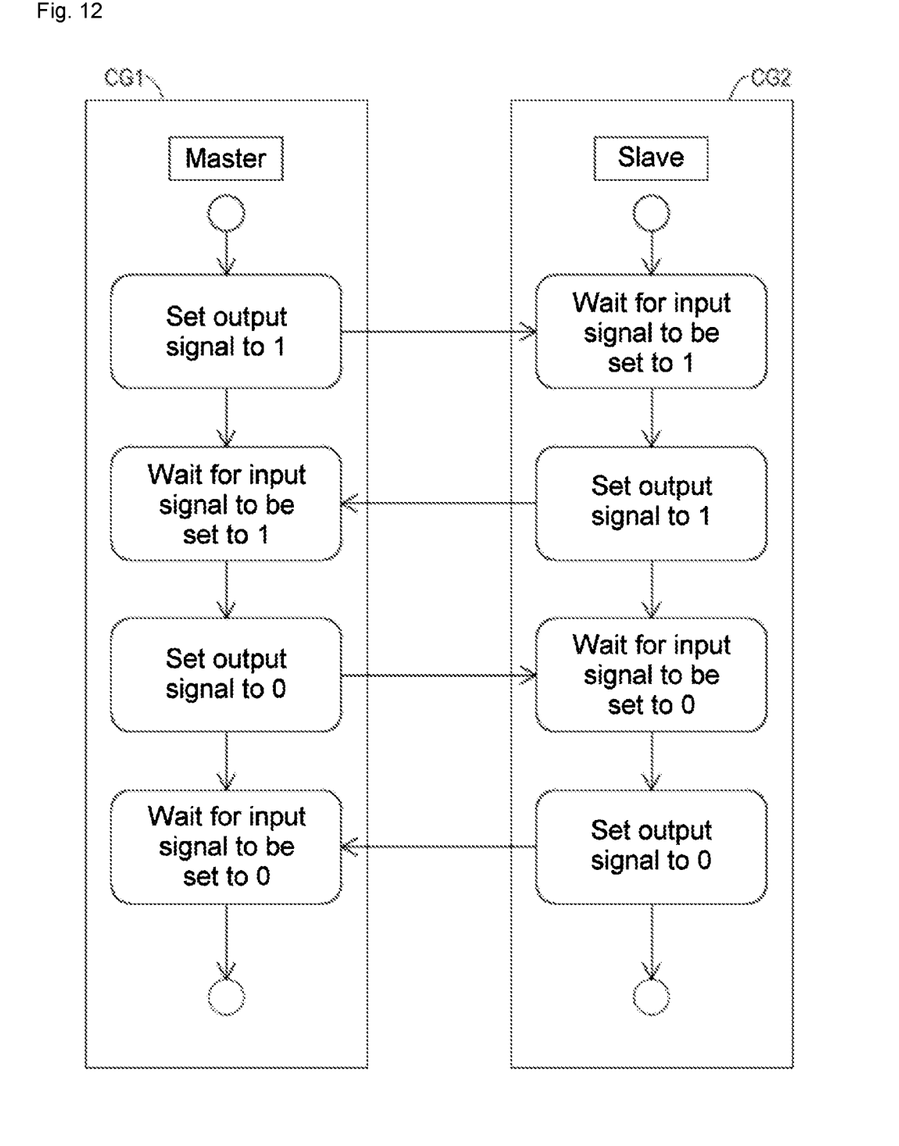
FIG. 12 is a diagrammatic illustration of a synchronisation of the master and slave touch screen boards using signals, according to one aspect of the invention.

The fourth exchange is shown in detail in FIG. 12 which represents an example of handshake using signals, which provides robustness of synchronisation.

The invention claimed is:

1. A touch screen system comprising two juxtaposed rectangular matrix touch panels (DT1, DT2), broken down into cells, comprising a border (F) between the two touch panels, each touch panel being connected to a respective touch screen board (CG1, CG2), and a data communication link (LC) between said boards (CG1, CG2), the two boards (CG1, CG2) and respectively the two touch panels (DT1, DT2) being configured as a master-slave configuration, wherein:

the master (CG1) and slave (CG2) boards are configured to generate and exchange a respective acquisition table (TA1, TA2) of the capacitance variations of each cell of their respective master (DT1) and slave (DT2) panels;

each of the master (CG1) and slave (CG2) boards is respectively configured to estimate a respective position (Detl, Det2) of a detected contact on the respective touch panel (DT1/DT2), on the basis of data from a central cell (CC) of the detected contact on one of the touch panels (DT1, DT2) and from at least four cells (C1, C2, C3, C4) surrounding the central cell (CC), at least one of the four cells (C1, C2, C3, C4) belongs to another of the touch panels (DT2, DT1) when the central cell (CC) is located on the edge of the border (F);

the slave board (CG2) is configured to transmit the estimated position (Det2) of the detected contact to the master board (CG1);

the master board (CG1) is configured to merge and track the estimated position of the detected contacts received from the slave board (CG2) and the estimated position of the detected contacts received from the master board (CG1); and the master board (CG1) is configured to apply filtering post-processings to the merged positions of the detected and tracked contacts.

2. The system according to claim 1, wherein the master (CG1) and slave (CG2) boards are configured to exchange their respective operating statuses (SF1, SF2).

3. The system according to claim 1, wherein the master (CG1) and slave (CG2) boards are configured to carry out, whilst they are generating their respective acquisition table (TA1, TA2), a pre-detection of a contact in an area of the touch panels comprising the border (F) and at a distance from the border, as a number of cells, less than a threshold, and configured to deactivate, in the case of absence of contact in that area, the exchanges between master and slave boards of the respective acquisition tables and of the positions of detected contacts.

4. The system according to claim 1, wherein a contact is a finger touch or a presence of a drop of water.

5. The system according to claim 2, wherein the status of the master board or the slave board comprises:

a parameter (Master) representative of the master function or not of the board; and/or a parameter (Request_Error) representative of the reception of an unknown user command; and/or a parameter (Touch_too_high) representative of a detection of a number of contacts above a threshold; and/or a parameter (Test_in_progress) representative of a test in progress; and/or a parameter (Idle) representative of the touch function on standby of the respective touch panel; and/or a parameter (Smooth_Running) representative of the absence of functional failure of the respective touch panel; and/or an error code (Code_Error) representative of a detected error; and/or a possible command (Order) sent by a user.

6. The system according to claim 1, wherein the master (CG1) and slave (CG2) boards are configured to be synchronised by changes of state or by software or hardware events.

7. The system according to claim 6, wherein the master (CG1) and slave (CG2) boards are configured to be synchronised by handshaking using signalling.

* * * * *